Aug. 26, 1969     J. E. CORNISH     3,462,855
TEACHING CABINET

Filed Oct. 14, 1968     4 Sheets-Sheet 1

INVENTOR
JUDSON E. CORNISH

BY *Semmes and Semmes*
ATTORNEYS

Aug. 26, 1969

J. E. CORNISH 3,462,855

TEACHING CABINET

Filed Oct. 14, 1968

INVENTOR
JUDSON E. CORNISH

BY *Semmes and Semmes*

ATTORNEYS

Aug. 26, 1969 J. E. CORNISH 3,462,855
TEACHING CABINET

Filed Oct. 14, 1968 4 Sheets-Sheet 4

INVENTOR
JUDSON E. CORNISH

BY *Semmes and Semmes*
ATTORNEYS

United States Patent Office 3,462,855
Patented Aug. 26, 1969

3,462,855
TEACHING CABINET
Judson E. Cornish, 3211 Tallywood Drive, Apt. 1,
Fayetteville, N.C. 28303
Filed Oct. 14, 1968, Ser. No. 767,288
Int. Cl. G09b 1/00
U.S. Cl. 35—60                                    8 Claims

ABSTRACT OF THE DISCLOSURE

An educational teaching aid, particularly a cabinet structure facilitating teaching of Morse code, languages, or like sciences using tape recorders and including access windows above tables permitting instructor monitoring of student activity within the cabinet.

BACKGROUND OF THE INVENTION

Field of the invention

Education, particularly teaching of the linguistic sciences and the sending and receiving of Morse code requires the student to listen to tape recorded practice materials, while responding audibly by imitating the linguistics heard or, in the case of Morse code, by manually "sending" or playing the Morse code signals recived. Conventionally, Morse code has been taught in a large classroom, each student being provided with individual tape recorder, hand sending key, and earphone set. The instructor monitors the students' activity visually while the students' "sending" generates an acoustical furor, which seriously impedes both instruction and learning capabilities. Conventional language teaching booths are sound proofed and enclosed on all sides, thus precluding a "instructor monitoring" of the student while using the Morse code sending key.

Description of the prior art

The prior art linguistic teaching booth has a single window, which permitted instructor monitoring to the extend that the instructor could tell if a tape recorder was being played or if the student was asleep within the booth. There is no suggestion of one or more windows permitting both monitoring of the tape recorder and study of the individual student's "first" for example while using a telegrapher's key or writing the language being received. For the most part the prior art instructional booths have been retangular in shape and linearly disposed with respect to an instructor head table.

SUMMARY OF THE INVENTION

According to the present invention a teaching console is constructed so that its frame defines a truncated top, converging sides, a relatively narrow front, and an open, doorway back. One or more work tables is supported within the housing interiorly adjacent the front and a teacher inspector window is mounted in the front adjacent each work table. According to the preferred embodiment of invention, the tape recorder is mounted upon the top table and a Morse code sending key is mounted upon the bottom table. Thus, the seated students' eyes or head and the tape recorder are simultaneously visible through the top window and the student sending key is visible through the bottom window. The top window thus facilitates eye-to-eye contact of instructor and student, as desired. The student when at work with his head bent downwardly is not aware whether his activity is being visually monitored by the instructor. However, when the instructor addresses him over an intercom system the student and instructor may make eye-to-eye contact through the top window. The bottom window enables the instructor to study the student's sending "first" while receiving the student's sending through an amplifier. The truncated shape of the individual cabinets and their semicircular disposition not only saves classroom space, but also facilitates central positioning of the instructor within the console.

DESCRIPTION OF THE PREFERRED EMBODIMENTS

Figure 1:
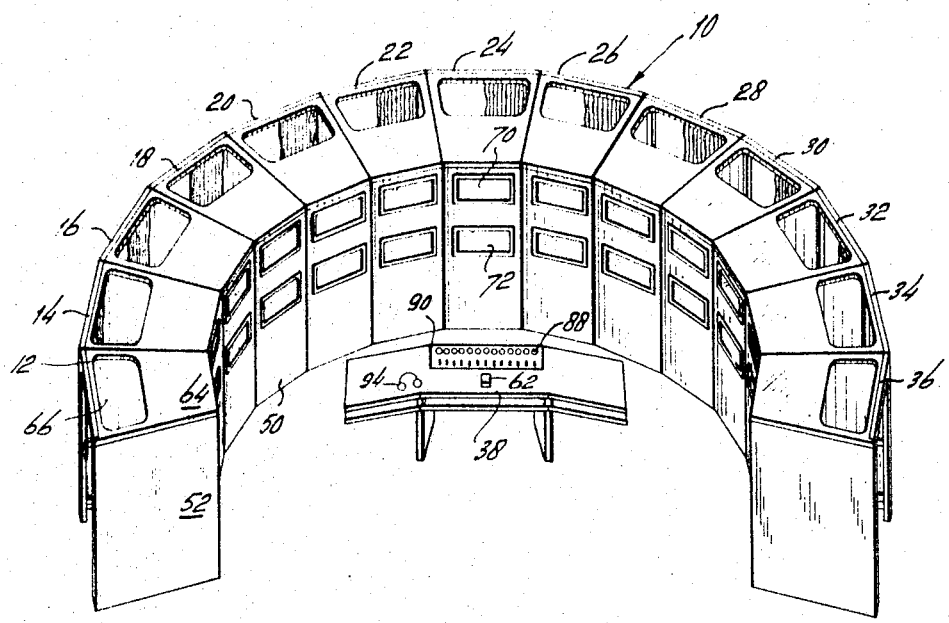
FIG. 1 is a perspective view of a proposed semi-circular installation embodying a plurality of teaching cabinets, encircling the instructor master control desk.
Figure 6:
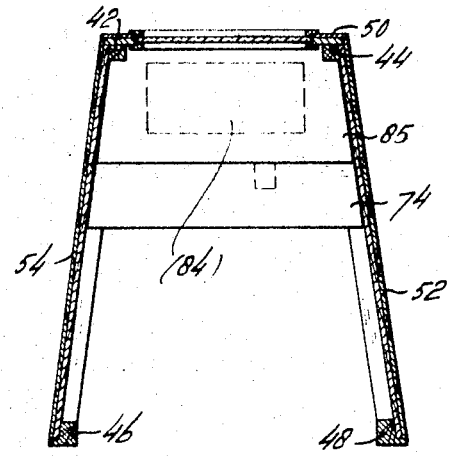
FIG. 6 is a vertical section taken along section line 6—6.
Figure 2:
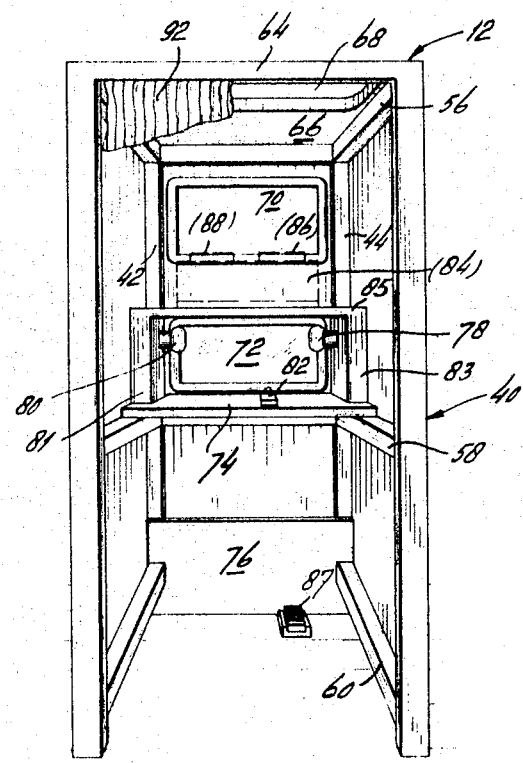
FIG. 2 is a rear perspective, partially fragmentary, of a teaching cabinet.
Figure 5:
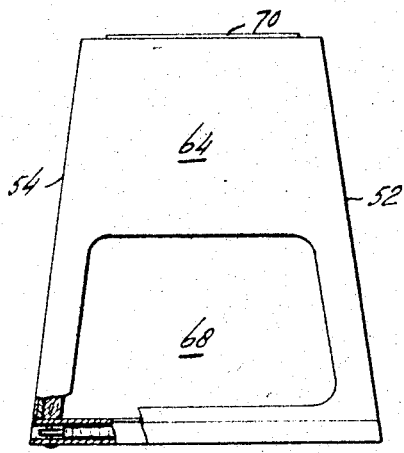
FIG. 5 is a top plan.
Figure 3:
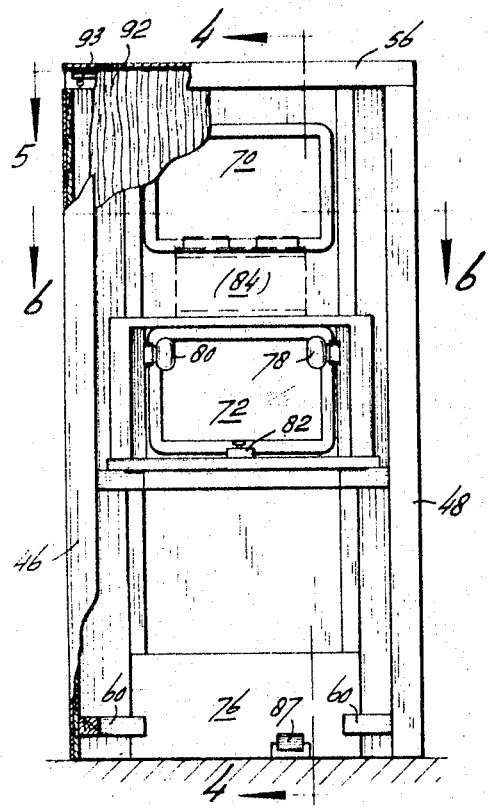
FIG. 3 is a rear elevation partially in section.

In FIG. 1 teaching console 10 is illustrated as comprised of individual teaching cabinets 12, 14, 16, 18, 20, 22, 24, 26, 28, 30, 32, 34, and 36 arranged in abutting relationship as a semi-circle around insetructor's table 38. The individual cabinet illustrated in FIGS. 2–6 is comprised of a frame defined by upstanding members 42, 44, 46, and 48, horizontal top struts 56, median struts 58 and bottom horizontal struts 60. A vertical footguard 76 may be positioned about bottom struts 60 within he front of the housing. Housing top 64 is truncated towards the housing front 50 which is relatively narrow intermediate converging sides 52 and 54. A ventilation or lighting aperture 68 may be provided in the top of the housing and within the interior of the housing adjacent the front inside are recorder table 85 supporting tape recorder 84, so that individual tape recorder reels 86 and 88 are visible through the top window 70. A student working table 74 may be supported adjacent bottom window 72, and be lighted by bulbs 78 and 80 mounted in panels 81 and 83. An individual Morse code sending key 82 may be positioned upon table 74 and the tape recorder 84 may be operated by foot pedal 87. Curtain 92 may be supported upon rod 93 at the back of the housing, so that the curtain may be closed during occupancy by a student.

Figure 4:
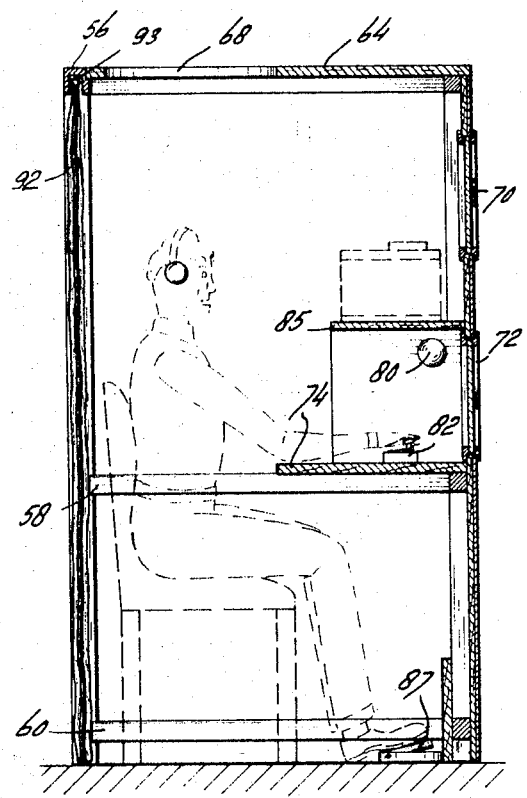
FIG. 4 is a sectional view taken along section line 4—4 of FIG. 3.

In the position illustarted in FIG. 4, the student may look above tape recorder 84 through window 70, when addressed by the instructor through an intercom system. During student work the student's head is normally lowered towards work table 74 where his activity with the keying device 82 is visible through window 72.

Manifestly, in the absence of a Morse code sending key the student's writing upon a piece of paper or other manual activity would also be visible through window 72. The instructor's table 38 includes individual audio switches 88 connecting mike 62 with the individual compartments and switches 90 which enable the instructor to "cut" into the sending of the students via key 82. A headset 94 and jack is provided for this purpose.

Figure 7:
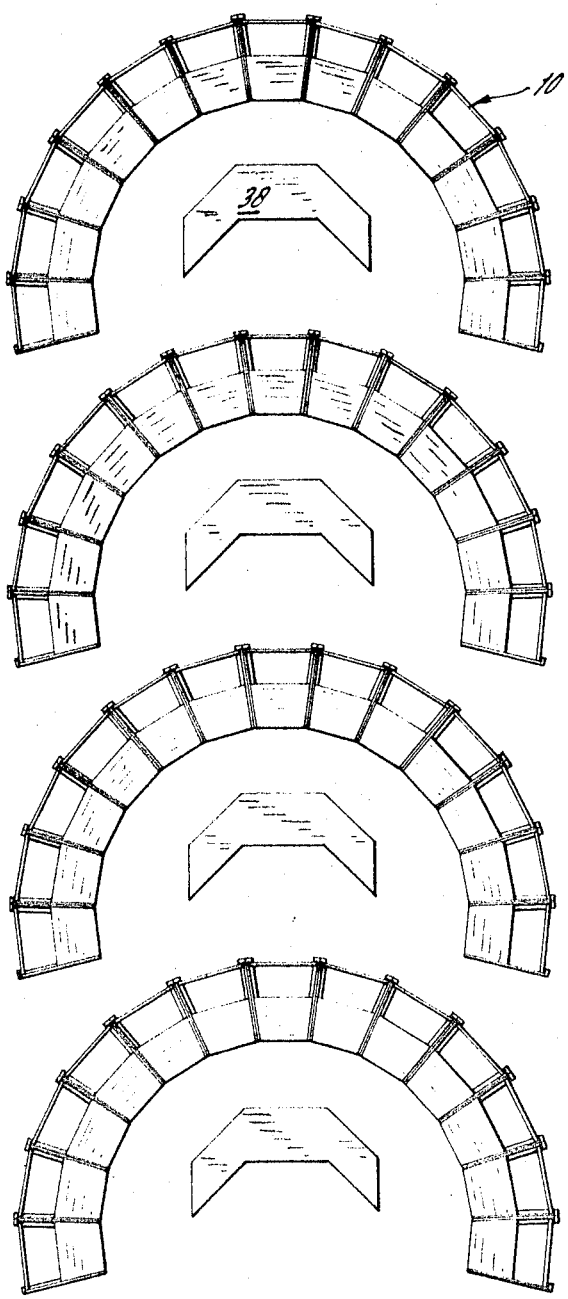
FIG. 7 is a top plan of a plurality of crescent-shaped or semi-circular shaped teaching consoles each comprised of a plurality of truncated teaching cabinets.

The arrangement of the students in arcs of thirteen around each instructor as illustrated in FIGS. 1 and 7 was designed for maximum supervision. The instructor is equidistant from each student. Each booth was designed to accommodate the student and the individual tape recorder comfortably in the smallest possible space. The student's paper and hands are visible by the instructor and so is the top of the tape recorder. The student cannot see the instructor unless he leans back and looks up.

The wiring is designed so that the instructor can "tune in" on one or more students at a time. He can hear the students' tape recorder and his keyer and can talk with him. The student cannot tell when he is being "tuned in" on. The instructor can see which characters the student is writing.

The instructor can plug a student into one of several remote tape recorders. Two or more student booths can be plugged together for nets.

Each booth is soundproof so the students are not disturbed by each other's noise.

On the instructor's desk there is a worksheet for each student in front of the switch for that student's booth.

I claim:

1. A teaching cabinet comprising:
   (A) a frame defining a housing having a truncated top including an open aperture, a relatively narrow front, converging sides and on open back defining a doorway;
   (B) a lower work table for manual work and an upper work table supported intermediate said sides and interiorly adjacent said front; and
   (C) windows within the housing front, as follows:
       (i) a widow adjacent and above the lower work table so positioned as to facilitate instructor visibility of the student hand activity, and
       (ii) a window adjacent and above the upper work table so positioned as to enable the student and instructor to make eye-to-eye contact.

2. A teaching cabinet as in claim 1, said lower work table including a Morse code sending key and earphone jack connected to a tape recorder supported upon said upper table.

3. A teaching cabinet as in claim 2, including a certain removably supported within said frame so as to close said doorway.

4. A teaching cabinet as in claim 3, including amplifier means connected to said sending key.

5. A teaching cabinet as in claim 4, including:
   (i) a footguard supported intermediate said sides beneath said lower work table, and
   (ii) a foot control pedal connected to said tape recorder.

6. A teaching cabinet as in claim 5, including a soundproofing means secured to the inner surfaces of said sides and top and interior lighting supported adjacent said upper work table.

7. A teaching console consisting of a plurality of teaching cabinets as recited in claim 8 and arranged in side-by-side relationship as a semi-circle.

8. A teaching console as in claim 7, in combination with an instructor's table positioned within said semi-circle and including amplifying means connected to said earphone jacks and said tape recorders, so as to provide instructor audio access through said amplifying means and visual access through said windows.

References Cited

UNITED STATES PATENTS

| 3,233,346 | 2/1966 | Cornberg | 35—60 |
| 3,330,955 | 7/1967 | Barecki et al. | 35—35 X |

OTHER REFERENCES

Audiovisual Instruction, vol. 6, No. 5, May 1961, p. 209.

EUGENE R. CAPOZIO, Primary Examiner

H. S. SKOGQUIST, Assistant Examiner

U.S. Cl. X.R.

35—14; 108—64